April 24, 1956     M. P. LAUGHLIN     2,742,751
LAWN CUTTING AND FERTILIZING APPARATUS
Filed Dec. 4, 1951
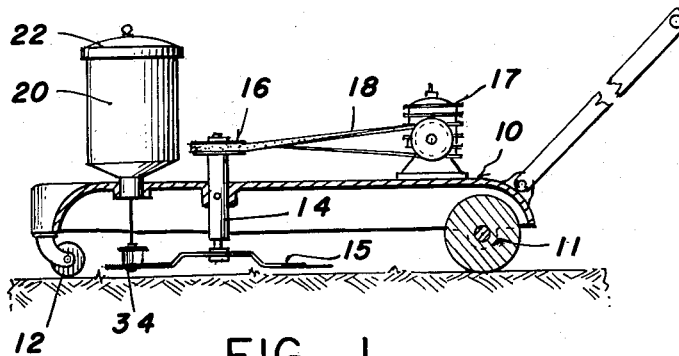
FIG. 1
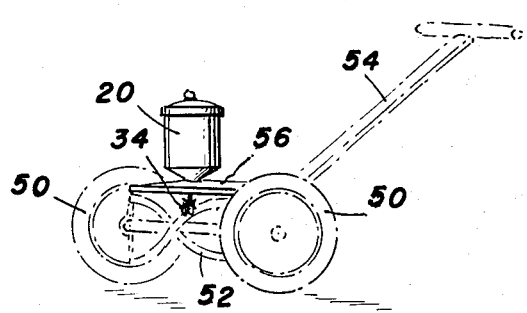
FIG. 2
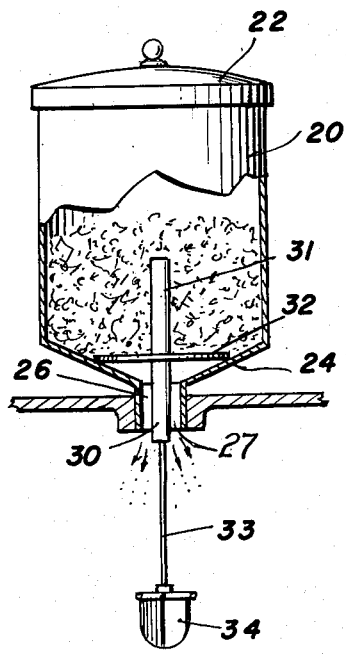
FIG. 3
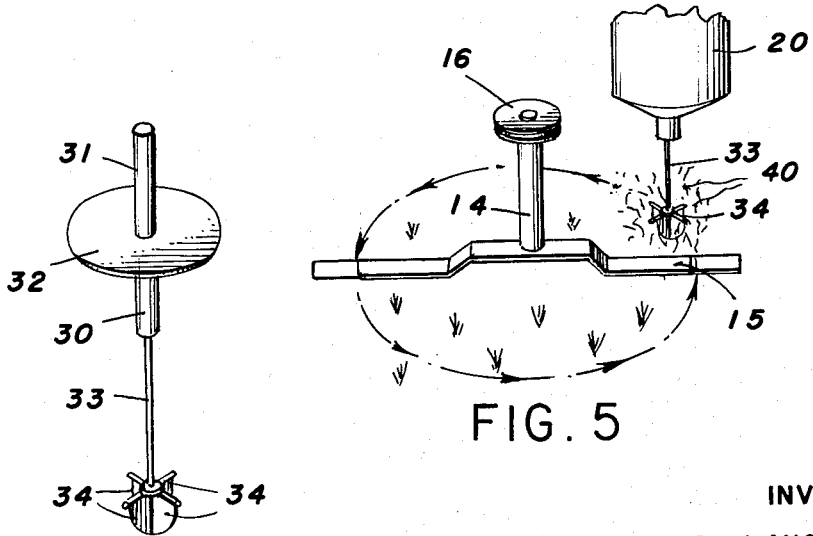
FIG. 4
FIG. 5
INVENTOR
MYRON P. LAUGHLIN United States Patent Office 2,742,751
Patented Apr. 24, 1956

2,742,751

LAWN CUTTING AND FERTILIZING APPARATUS

Myron P. Laughlin, St. Petersburg, Fla.

Application December 4, 1951, Serial No. 259,833

10 Claims. (Cl. 56—229)

This invention relates to lawn building apparatus, and more particularly to a combined lawn mower and material feeder for supplying chemical additives to the fresh cuttings from the lawn mower.

Heretofore it has been well known that certain advantages and improvements were obtained when grass and lawn vegetation were formed into a mulch and spread over the lawn area. It has long been common to gather in piles cut grass, leaves and the like, and with or without chemical additions to such piles, to allow the same to decompose and react, whereupon the end products are again distributed over the growing area to restore elements, mainly nitrates, to the soil. In the case of farmlands, it has been usual to add animal manures to such composts and scatter the same through the means of more or less complicated spreading machines. Such earlier fertilizers also often required mixture and distribution with additions, such as lime, phosphates, sulphates, nitrates and the like to compensate for local soil deficiencies and to restore the fertility of the soil.

However, for city property, farm methods have proven unsightly and objectionable from a health standpoint, since rotting composts and manure both breed flies and produce unhealthy odors, while farm labor and machinery are unavailable. In view of the above, common practice in cities has been to rake up cut grass and throw away this potentially valuable material, then to scatter costly commercial fertilizers with materials added to replace the discarded vegetation. Claims have also been made that lawnmowers of improved types finely cut and partially mulch the grass as it is cut, then redistribute it over the cut area. Such fine cutting and redistribution has, however, mainly resulted in simply drying the cut grass into inert hay, which often has been swept away by the wind and otherwise removed from the growing area so that any after addition of chemicals to produce a true build-up product is impossible. It is the primary purpose of this invention to provide for distributing of fertilizers and chemical additions and the production of a true compost material without separate gathering and distributing operations with one traverse over the area and simultaneously with the cutting and mulching operations.

It is also the purpose of this invention to accomplish all the purposes of mixing and addition at the instant the grass and vegetation is cut and before it can dry or lose any of its valuable components.

Another object of this invention is to provide in one apparatus a cutting and distributing mechanism which eliminates a substantial part of the cost of such devices while, at the same time, cutting the cost of operation approximately in half.

A primary object of this invention is to provide means whereby chemical additions required to restore the soil of the growing area are automatically proportioned both to the area and to the vegetation cut, being thoroughly premixed before application.

Another object of this invention is to place means in the hands of the average householder for the scientific application of lawn restoring chemicals and the proper combination of such chemicals with mulch and cut vegetation in a single operation.

It should be understood further that certain of the latest improved types of lawnmowers provide a roller which follows the cutting mechanism and which presses the cut material into the lawn surface and it is a purpose of this invention to provide for the addition of chemical restoratives to the cut materials before they are so rolled, thus providing for the laying down of a complete soil restoration material without further concern on the part of the operator.

It is also a primary purpose of this invention to provide improved apparatus accomplishing cutting, mixing and distributing for the purposes which have been heretofore described and to provide such apparatus in a form designed to operate over any terrain which may be encountered even though such may involve climbing gradients of forty degrees or more and traversing ground of such soft mucky nature that ordinary means of power traction are valueless.

Certain other improvements and advantages will appear as the description of a preferred embodiment progresses and by reference to the appended drawings in which:

Fig. 1 is a partial cross-section of a rotary type lawnmower to which an embodiment of my invention's principal apparatus has been applied.

Fig. 2 shows in perspective a reel type mower and another application of an embodiment of my apparatus.

Fig. 3 enlarges the apparatus of Fig. 1, is partially broken away to show the internal mechanism and includes the final mixing and distributing zone.

Fig. 4 is a detail of the mechanical mixer and valve; and

Fig. 5 diagrammatically illustrates this embodiment in action with the rotary mower selected for descriptive purposes.

Referring to Fig. 1, the rotary mower shown for purposes of description includes a bed 10 mounted upon such supporting means as a roller 11 and a wheel 12. Journalled in bed 10 is a vertical bearing 14 wherein revolves a spindle upon which is mounted cutter 15. The spindle within bearing 14 is commonly driven by such means as pulley 16 and prime mover 17 through a belt 18 after the fashion well known to the art.

In the performance of my invention, I prefer to mount a mixer tank or canister 20 upon the bed 10 and to provide this canister with a removable cover 22. Canister 20 is preferably tapered as at 24 in Fig. 3 and extends into a discharge tube or duct 26 extending through bed 10, said duct terminating at its lower end in an outlet 27 disposed generally above the cutter 15. Mounted within the canister 20 and extending into the duct 26 is an agitator and valve mechanism of the type shown in Fig. 4 wherein stem 30 extends upwardly as at 31 to mount a valve disc 32 and to provide an agitating rod in canister 20. Stem 30 is preferably provided with a spring wire extension 33 depending downwardly from its lower end and attaching trigger vanes 34 mounted thereon. Trigger vanes 34 extend below the bed 10 of the mower a sufficient distance so that the cutter bar in its revolution contacts the lower end, as shown in Fig. 3 and by this action agitates rod 31 so that chemicals placed in canister 20 are thoroughly mixed and agitated while kept broken up in a flowing state. Valve 32 moves slightly with this striking action, but is more fully operated when cutter 15 commences to cut the lawn vegetation as shown in Fig. 5 wherein the cut vegetation 40 is thrown by the cutter bar against trigger vanes 34.

It will be understood that in a rotary mower, the condition under the bed 10 is that of a maelstrom wherein the vegetation is cut and recut as it is thrown upward and falls down again against the cutter.

It will also be understood that the thrown material strikes trigger vanes 34 very strongly agitating valve 32 away from its seat on the bottom 24 in canister 20 and discharging the contents of the canister in proportion to the blow struck upon trigger vanes 34 which is, of course, in part due to the cutter bar and in part due to the thrown material. It will be clear that in this fashion the discharge from canister 20 through tube or duct 26 is in proportion not only to the speed of the mower, but to the amount of material cut, the amount of material cut being the major factor. The chemical discharge is proportionate to the organic cut material with which it is to be mixed and the cut material, plus the chemicals discharged from the mower, now becomes a definite compound.

Referring again to Fig. 1, it will be seen that such material as discharged rearwardly in this type of mower would be rolled by the roller 11 as the mower moves forward.

Referring to Fig. 2, 50 indicates the wheels of a mower having the spiral cutter 52 and the usual drive mechanism therebetween well known in the construction of such mowers, but which has been omitted here for purposes of clarity. Mowers of this type are commonly propelled by a hand bar 54 and upon the frame work 66 of the mower the canister 20 may be mounted with the trigger 34 extending downward into close proximity with the cutter 52 as has been described for the rotary type mower. The internal mechanism of canister 20 is similar to that which has been described.

It will be manifest that while I have described illustrated mechanism particularly suited to the performance of my invention, other types of lawn mowers and other dispensing and mixing means may also be combined as proposed within the scope of my invention and within that of the appended claims.

I claim:

1. A combined lawn mower and material feeder comprising a mobile frame having rotatable grass-cutting means and a material container mounted thereon, said container having a discharge duct, said duct having a material outlet disposed generally above said cutting means, and means associated with said duct and said cutting means for causing discharge of material through said duct towards said cutting means whereby to mix the discharged material with the fresh cuttings from the cutting means.

2. A combined lawn mower and material feeder comprising a mobile frame having rotatable grass-cutting means and a material container mounted thereon, said container having a discharge duct terminating in a material outlet disposed generally above said cutting means, a valve associated with said duct for controlling discharge of material through said outlet, and means associated with said valve and said cutting means for actuating said valve, whereby to cause discharge of said material through the outlet toward said cutting means and mixing of the discharged material with the fresh cuttings from said cutting means.

3. A combined lawn mower and material feeder comprising a mobile frame having rotatable grass-cutting means and a material container mounted thereon, said container having a discharge duct terminating in a material outlet disposed generally above said cutting means, a valve associated with said duct for controlling the discharge of material through said outlet, and means extending from the valve into the path of rotation of said cutting means for actuating said valve responsively to rotation of said cutting means, thereby to cause discharge of the material through the outlet toward said cutting means and mixing of the discharged material with the fresh cuttings from said cutting means.

4. A combined lawn mower and material feeder comprising a mobile frame having rotatable grass-cutting means and a material container mounted thereon, said container having a discharge duct terminating in an outlet disposed generally above said cutting means, combined material agitating and discharge-control means in said container, and means associated with said material mixing and discharge-control means and said cutting means for effecting agitation of the material within the container and for causing discharge of said material through said outlet toward said cutting means, whereby to mix the discharged material with the fresh cuttings from the cutting means.

5. A combined lawn mower and material feeder comprising a mobile frame having rotatable grass-cutting means and a material container mounted thereon, said container having a discharge duct terminating in an outlet disposed generally above said cutting means, combined material agitating and discharge-control means in said container, and means extending from said combined means into the path of rotation of said cutting means for effecting actuation of said combined means responsively to rotation of said cutting means, thereby to agitate the material in the container and to cause controlled discharge of said material through said outlet toward said cutting means and thereupon the mixing of the discharged material with the fresh cuttings from the cutting means.

6. A combined lawn mower and material feeder as set forth in claim 3, wherein the means for actuating the valve responsively to rotation of the cutting means includes trigger means positioned so as to be successively struck by the individual cutting elements of said cutting means.

7. A combined lawn mower and material feeder as set forth in claim 3, wherein the means for actuating the valve responsively to rotation of the cutting means includes an elongated spring member depending from said valve through said duct and carrying at its lower end a trigger positioned so as to be successively struck by the individual cutting elements of said cutting means.

8. A combined lawn mower and material feeder as set forth in claim 5, wherein the means for effecting actuation of the combined material agitating and discharge-control means responsively to rotation of said cutting means includes an elongated spring member depending from said means through the duct and carrying at its lower end a trigger positioned so as to be successively struck by the individual cutting elements of said cutting means.

9. Combined lawn mower and material feeder mechanism substantially as set forth in claim 1, wherein the mechanism includes a roller moving with said frame for rolling the mixture of discharged material and fresh cuttings into the lawn.

10. Combined lawn mower and material feeder mechanism substantially as set forth in claim 1, wherein said frame is supported at least in part by a roller positioned to press the mixture of discharged material and fresh cuttings into the lawn.

References Cited in the file of this patent

UNITED STATES PATENTS

| | | |
|---|---|---|
| 1,827,559 | Beazley | Oct. 13, 1931 |
| 1,876,409 | Gordon | Sept. 6, 1932 |
| 1,880,154 | Rotondo et al. | Sept. 27, 1932 |
| 2,242,710 | Loomis | May 20, 1941 |
| 2,503,416 | Russell | Apr. 11, 1950 |
| 2,573,784 | Asbury | Nov. 6, 1951 |